Sept. 22, 1942.   B. J. CARR   2,296,597
TOOL HOLDER
Filed March 24, 1941
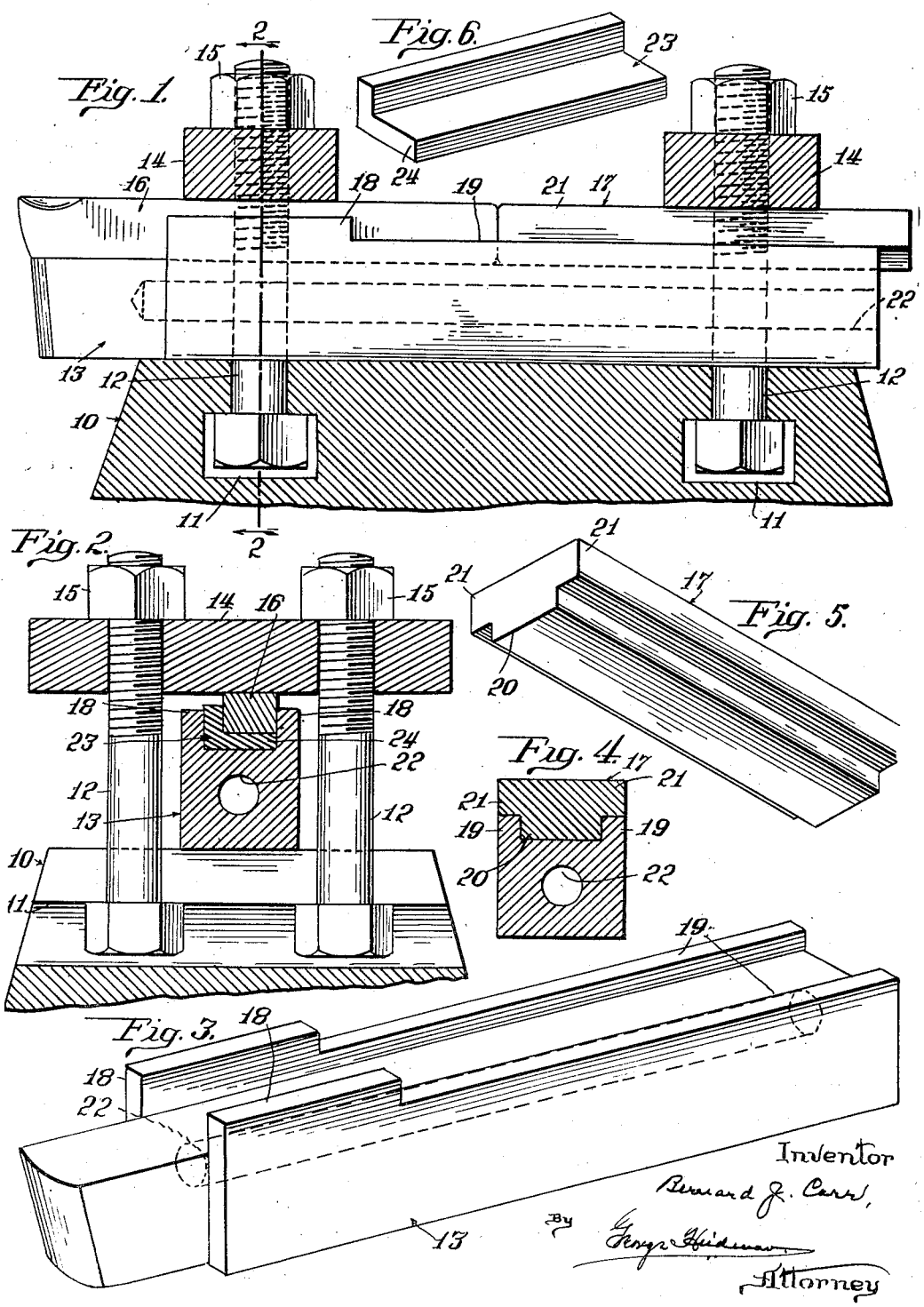
Inventor
Bernard J. Carr,
By George Heideman
Attorney Patented Sept. 22, 1942

2,296,597

UNITED STATES PATENT OFFICE 2,296,597

TOOL HOLDER

Bernard J. Carr, San Bernardino, Calif.

Application March 24, 1941, Serial No. 384,823

1 Claim. (Cl. 29—96)

My invention relates to tool holding means for metal working machines, such as lathes and the like, adapted to firmly hold the tool, and particularly a small tool, against any backward movement and provide proper support, thereby enabling use of a small high speed tool without sacrificing efficiency; the means preventing vibration and resultant wear.

The invention also has for its object the provision of a holder adapted to rapidly dissipate or conduct the heat away from the holder and its contained tool, thus enabling a small tool to be employed with increased efficiency and period of usefulness.

The objects and advantages enumerated as well as other advantages inherent in the invention will all be more readily comprehended from the detailed description of the accompanying drawing wherein—

Figure 1 is a sectional elevation of a portion of a lathe compound with my improved tool holder and a tool in place.

Figure 2 is a vertical section taken on the line 2—2 of Figure 1, looking in the direction of the arrows, showing a small tool and a shim.

Figure 3 is a perspective view of my improved tool holder.

Figure 4 is a rear end view of the holder with the tool "backing up" member applied.

Figure 5 is a perspective view of the "backing up" member.

Figure 6 is a perspective view of the shim employed in Figure 2 for use with a small tool.

My improved tool holder is adapted for use with the conventional type of lathe at present in use; a portion of the lathe compound being shown at 10 provided with the transverse slots 11, 11 to receive the heads of the bolts 12, whereby the tool holder 13 is clamped in place through the medium of the clamping bars 14 and nuts 15.

The holder 13 is of length greater than that of the tool to be held (a tool being shown at 16 in Figure 1) and which is "backed up" by a slide plate or member 17.

The tool holder 13, adapted for use on large lathes employing two bar clamping bars or the equivalent, is of length greater than that of the tool to be used and at a short distance from its forward end is provided with upstanding side walls 18, 18 adapted to extend upwardly on opposite sides of the cutting tool 16, substantially midway between the ends of the tool as shown in Figure 1, but preferably of such height as not to extend to the upper surface of the tool; and this portion of the holder is preferably disposed beneath the front clamping bar 14 as shown.

These side walls 18 terminate at their rear sides in the vertically reduced side wall portions 19 which extend to the rear end of the holder as shown in Figure 3 and prevent any sidewise shifting of the cutting tool.

In order to properly "back up" the tool and prevent possibility of its movement lengthwise of the holder, I provide a "backing up" slide or plate 17 of T-shape cross section as shown in Figure 5; the main body portion 20 of the plate being adapted to fit into the holder 13 between the reduced side wall portions 19 and to fill the channel in the holder, while the extended sides or flange portions 21 are intended to rest on the reduced side wall portions 19 of the holder as shown in Figure 4 with the main body portion 20 of the plate also resting on the bottom of the channel in the holder so as to transmit the pressure to the entire body of the holder rearward of the cutting tool. This plate or member 17 is intended to be engaged by the rear clamping bar 14 and firmly clamped in place when the nuts 15 on the bolts 12 are screwed down, as shown in Figure 1; the plate being placed in the holder in engagement with the rear end of the tool 16 to prevent backward movement of the tool; the holder thus being provided with a multiple of clamping points for holding it firmly on the compound.

The body of the tool holder 13 is provided with a bore or passage 22 arranged centrally, parallel with the base and extending from the rear end of the holder to a point in proximity to the front end for the purpose of dissipating heat and, if desired, this passage may be provided with a rapid heat conducting element or fluid, although the passage in practice has been found sufficient to dissipate or conduct the heat away from the forward tool holding end of the holder generated at the cutting edge of the tool and transmitted to the holder which is preferably constructed of metal having greater thermal conductivity than the tool steel. In actual practice it has been found that my improved tool holder, provided with the means of heat transmission and radiation, materially increased the effectiveness and resulted in a small tool, of the same grade of tool steel as a large tool, which completely exceeded the performance of the large tools usually employed on the lathes; the small tool lasting more than double the cutting time of the larger tool; and as the small tool requires less than a third of the grinding time of the large tool, a material saving in time, labor and material is effected.

In operation, the small tool is placed in the forward end of the holder between the wall portions 18, with the bottom of the tool in clean condition and flush with the upper face of the holder, with its cutting point at the forward end of the holder. The backing plate 17 is then applied to the rear end of the holder in contact with the rear end of the cutting tool 16; and the holder with tool and backing plate then positioned beneath the clamping bars which are forced into tight clamping relation with the top of the tool and the top of the backing plate or member 17 by screwing up the nuts 15 on the bolts.

The backing plate or member 17 is preferably of the same vertical dimensions as the tool and the flange portions 21 of the plate such that the top of the backer plate will lie in substantially the same horizontal plane as the top of the tool (and hence the side wall portions 19 are of less height as shown) in order that a proper clamping of the holder may be obtained.

My improved holder is designed especially to receive a cutting tool smaller than the usual large tools employed, but in the event a still smaller tool is to be employed, I provide an angle shim 23, see Figure 6, of predetermined dimensions, with one side 24 corresponding to the width of the channel in the holder 13 as shown in Figure 2, while the other side of the angle shim extends upwardly between the tool and one side wall of the holder and thus prevents any lateral movement between the tool and holder while at the same time disposing the tool sufficiently above the holder to enable the tool to be engaged by the clamp bar 14. The shim, which extends from the cutting edge to a point rearward of the front clamping bar, thus adapts my improved holder to small tools of varying sizes.

My improved holder is adapted to hold any angle bent tool as well as a straight tool, but it will be understood that the forward end of the holder may likewise be bent or disposed to the right or to the left in keeping with the tool so as to provide proper contact and support at the cutting point.

For purposes of exemplification, I have shown my improved holder applied to a lathe compound provided with clamping bars, but any other suitable clamping means may be employed as is readily apparent, as for example the type of post and clamping means disclosed in my application Serial Number 336,528; and although the exemplification has been described in terms employed for purposes of description and not as terms of limitation, structural modifications may be possible without, however, departing from the spirit of my invention as defined in the appended claim.

What I claim is:

A tool holder consisting of an elongated comparatively thick metal bar of rectangular cross-section, of length greater than the length of the tool and provided with a longitudinally extending heat dissipating bore extending from the rear end to a point rearward of the front end, the holder at opposite sides having upstanding walls to provide a tool holding channel therebetween and extending from a point rearward of the immediate forward end to the rear end of the bar and at a point removed from their forward ends being reduced, the upper surfaces of said walls being parallel with the bottom of said channel, in combination with a backing plate of T-shape cross-section seatable in the channel and on the reduced portions of said walls rearward of the cutting tool.

BERNARD J. CARR.